US012573327B2

(12) United States Patent
Chen et al.

(10) Patent No.: US 12,573,327 B2
(45) **Date of Patent: *Mar. 10, 2026**

(54) BRIGHTNESS CORRECTING METHOD OF DISPLAY PANEL AND BRIGHTNESS CORRECTING DEVICE

(71) Applicant: TCL CHINA STAR OPTOELECTRONICS TECHNOLOGY CO., LTD., Shenzhen (CN)

(72) Inventors: Xinhong Chen, Shenzhen (CN); Wenli Wang, Shenzhen (CN); Kaiyong Yi, Shenzhen (CN); Xiaojian Kang, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/964,427

(22) Filed: Nov. 30, 2024

(65) Prior Publication Data

US 2025/0095533 A1 Mar. 20, 2025

Related U.S. Application Data

(63) Continuation of application No. 17/432,472, filed as application No. PCT/CN2021/101176 on Jun. 21, 2021, now Pat. No. 12,183,242.

(30) Foreign Application Priority Data

Jun. 4, 2021 (CN) ......................... 202110626060.4

(51) Int. Cl.
*G09G 3/34* (2006.01)
*G09G 3/20* (2006.01)

(52) U.S. Cl.
CPC ... *G09G 3/2007* (2013.01); *G09G 2320/0233* (2013.01); *G09G 2320/0686* (2013.01); *G09G 2360/16* (2013.01)

(58) Field of Classification Search
CPC .. G09G 3/00; G09G 3/20; G09G 3/32; G09G 3/34; G09G 3/36; G09G 3/3225;
(Continued)

(56) References Cited

U.S. PATENT DOCUMENTS

| | | | | |
|---|---|---|---|---|
| 2018/0286298 | A1 | 10/2018 | Levin | |
| 2021/0166655 | A1* | 6/2021 | Bian | G09G 3/2003 |

FOREIGN PATENT DOCUMENTS

| | | | |
|---|---|---|---|
| CN | 101923820 | A | 12/2010 |
| CN | 106713903 | A | 5/2017 |

(Continued)

OTHER PUBLICATIONS

International Search Report in International application No. PCT/CN2021/101176, mailed on Mar. 2, 2022.

(Continued)

*Primary Examiner* — Chanh D Nguyen
*Assistant Examiner* — Nguyen H Truong
(74) *Attorney, Agent, or Firm* — PV IP PC; Peter Stecher; Wei Te Chung

(57) ABSTRACT

A brightness correcting method of a display panel and a brightness correcting device are disclosed. The method divides a displayed image of the display panel into a first area and a plurality of second areas disposed surrounding the first area. A brightness correction factor of each of the second areas is obtained according to a brightness of the first area and a brightness of each of the second areas. An optical compensation value is adjusted according to the brightness correction factor. The method corrects a brightness of the
(Continued)

display panel to allow uniformity of overall brightness of the display panel to meet requirements.

20 Claims, 4 Drawing Sheets

(58) Field of Classification Search
CPC .......... G09G 5/00; G09G 5/10; G02F 1/1335; G02F 1/1362; G02F 1/13357
See application file for complete search history.

(56) References Cited

FOREIGN PATENT DOCUMENTS

| | | | |
|---|---|---|---|
| CN | 107068037 | A | 8/2017 |
| CN | 109285498 | A | 1/2019 |
| CN | 109712592 | A | 5/2019 |
| CN | 110070824 | A | 7/2019 |
| CN | 111710277 | A | 9/2020 |
| CN | 111968583 | A | 11/2020 |
| TW | 201027495 | A | 7/2010 |

OTHER PUBLICATIONS

Written Opinion of the International Search Authority in International application No. PCT/CN2021/101176, mailed on Mar. 2, 2022.
Chinese Office Action issued in corresponding Chinese Patent Application No. 202110626060.4 dated Jan. 19, 2022, pp. 1-11.
Chinese Rejection Decision issued in corresponding Chinese Patent Application No. 202110626060.4 dated Sep. 6, 2022, pp. 1-6.

* cited by examiner

BRIGHTNESS CORRECTING METHOD OF DISPLAY PANEL AND BRIGHTNESS CORRECTING DEVICE

CROSS-REFERENCE TO RELATED APPLICATION

This application is a continuation of U.S. non-provisional application Ser. No. 17/432,472, filed on Aug. 19, 2021, which claims priority to and the benefit of International Patent Application No. PCT/CN2021/101176, filed on Jun. 21, 2021, which claims priority to and the benefit of Chinese Patent Application No. 202110626060.4, filed on Jun. 4, 2021, the disclosures of the aforementioned applications are incorporated herein by reference in their entireties.

TECHNICAL FIELD

The present disclosure relates to the field of display technologies, and more particularly, to a brightness correcting method of a display panel and a brightness correcting device.

BACKGROUND

At present, in modern communication industry, the market demand for mobile phones, TVs, tablets, notebooks, digital cameras, and other products is increasing, and various display devices are also developing toward high resolution. Therefore, uniformity of overall brightness of display panels also faces new requirements.

Wherein, differences of transient voltages and gamma voltages between centers and corners of liquid crystal display panels cause the uniformity of overall brightness of the display panels to not be up to standards, thereby being unable to meet requirements of the uniformity of overall brightness of the display panels. Areas causing the uniformity of overall brightness of the display panels to not be up to standards are generally two corners on one side of source electrodes.

Therefore, how to make the overall brightness of the display panels meet the requirements is a difficult problem that panel manufacturers need to overcome.

Technical problem: an embodiment of the present disclosure provides a brightness correcting method of a display panel and a brightness correcting device to solve a technical problem of the uniformity of overall brightness of the display panels being unable to be up to standards in current technology.

SUMMARY

The present disclosure provides a brightness correcting method of a display panel, which includes following steps:

obtaining a displayed image of the display panel, wherein, the displayed image includes a first area and a plurality of second areas disposed surrounding the first area;

obtaining a brightness of the first area and a brightness of each of the second areas;

calculating a brightness correction factor of each of the second areas according to the brightness of the first area and the brightness of each of the second areas; and correcting a brightness of the display panel according to the brightness correction factor.

Optionally, in some embodiments of the present disclosure, a width of the first area and a width of each of the second areas are both one third of a width of the displayed image, and a length of the first area and a length of each of the second areas are both one third of a length of the displayed image.

Optionally, in some embodiments of the present disclosure, the step of obtaining the brightness of the first area and the brightness of each of the second areas includes following steps:

obtaining a central point of the first area and a central point of each of the second areas;

obtaining a brightness of the central point of the first area and defining the brightness of the central point of the first area as the brightness of the first area; and obtaining a brightness of the central point of each of the second areas and defining the brightness of the central point of each of the second areas as the brightness of each of the second areas.

Optionally, in some embodiments of the present disclosure, the step of calculating the brightness correction factor of each of the second areas according to the brightness of the first area and the brightness of each of the second areas includes following steps:

calculating a ratio of the brightness of the first area to the brightness of each of the second areas, wherein, the ratio is a quotient of the brightness of the first area divided by the brightness of each of the second areas; and defining the ratio as the brightness correction factor of each of the second areas.

Optionally, in some embodiments of the present disclosure, before the step of correcting the brightness of the display panel according to the brightness correction factor, the method further includes:

amending the brightness correction factor.

Optionally, in some embodiments of the present disclosure, the step of amending the brightness correction factor includes following steps:

performing a simulation correction on the display panel using the brightness correction factor;

obtaining a brightness non-uniformity of each of the second areas; and optimizing the brightness correction factor according to the brightness of the first area and the brightness of each of the second areas when the brightness non-uniformity of each of the second areas is greater than a default value to allow the brightness non-uniformity of each of the second areas to be less than or equal to the default value.

Optionally, in some embodiments of the present disclosure, the step of correcting the brightness of the display panel according to the brightness correction factor includes following steps:

adjusting a compensation value of the display panel according to the brightness correction factor; and compensating the display panel using an adjusted compensation value to correct the brightness of the display panel.

Optionally, in some embodiments of the present disclosure, the brightness correction factor includes a film position identification code, and the film position identification code is configured to identify the brightness correction factor for calling a corresponding brightness correction factor when correcting the brightness of the display panel.

The present disclosure further provides a brightness correcting method of a display panel, which includes following steps:

obtaining a displayed image of the display panel, wherein, the displayed image includes a first area and a plurality of second areas disposed surrounding the first area, a width of the first area and a width of each of the second areas are both one third of a width of the displayed image, and a length of the first area and a length of each of the second areas are both one third of a length of the displayed image;

obtaining a brightness of the first area and a brightness of each of the second areas;

calculating a brightness correction factor of each of the second areas according to the brightness of the first area and the brightness of each of the second areas;

amending the brightness correction factor; and correcting a brightness of the display panel according to an amended brightness correction factor.

Optionally, in some embodiments of the present disclosure, the step of obtaining the brightness of the first area and the brightness of each of the second areas includes following steps:

obtaining a central point of the first area and a central point of each of the second areas;

obtaining a brightness of the central point of the first area and defining the brightness of the central point of the first area as the brightness of the first area; and obtaining a brightness of the central point of each of the second areas and defining the brightness of the central point of each of the second areas as the brightness of each of the second areas.

Optionally, in some embodiments of the present disclosure, the central point of the first area is a geometric center of the first area, and the central point of each of the second areas is a geometric center of each of the second areas.

Optionally, in some embodiments of the present disclosure, the brightness of the central point of the first area and the brightness of the central point of each of the second areas are both obtained by a color analyzer.

Optionally, in some embodiments of the present disclosure, the step of calculating the brightness correction factor of each of the second areas according to the brightness of the first area and the brightness of each of the second areas includes following steps:

calculating a ratio of the brightness of the first area to the brightness of each of the second areas, wherein, the ratio is a quotient of the brightness of the first area divided by the brightness of each of the second areas; and defining the ratio as the brightness correction factor of each of the second areas.

Optionally, in some embodiments of the present disclosure, the step of amending the brightness correction factor includes following steps:

performing a simulation correction on the display panel using the brightness correction factor;

obtaining a brightness non-uniformity of each of the second areas; and optimizing the brightness correction factor according to the brightness of the first area and the brightness of each of the second areas when the brightness non-uniformity of each of the second areas is greater than a default value to allow the brightness non-uniformity of each of the second areas to be less than or equal to the default value.

Optionally, in some embodiments of the present disclosure, the default value ranges from 8% to 12%.

Optionally, in some embodiments of the present disclosure, the step of correcting the brightness of the display panel according to the brightness correction factor includes following steps:

adjusting a compensation value of the display panel according to the brightness correction factor; and compensating the display panel using an adjusted compensation value to correct the brightness of the display panel.

Optionally, in some embodiments of the present disclosure, the brightness correction factor includes a film position identification code, and the film position identification code is configured to identify the brightness correction factor for calling a corresponding brightness correction factor when correcting the brightness of the display panel.

Optionally, in some embodiments of the present disclosure, the step of obtaining the displayed image of the display panel includes following steps:

removing image sticking of the display panel to allow the display panel to be in an initial state;

sending a white image to the display panel; and obtaining the displayed image of the display panel when displaying the white image.

An embodiment of the present disclosure provides a brightness correcting device of the display panel, which includes:

a first obtaining unit configured to obtain a displayed image of the display panel, wherein, the displayed image includes a first area and a plurality of second areas disposed surrounding the first area;

a second obtaining unit configured to obtain a brightness of the first area and a brightness of each of the second areas;

a calculating unit configured to calculate a brightness correction factor of each of the second areas according to the brightness of the first area and the brightness of each of the second areas; and a correcting unit configured to correct a brightness of the display panel according to the brightness correction factor.

Optionally, in some embodiments of the present disclosure, the brightness correcting device further includes an amending unit configured to amend the brightness correction factor.

Beneficial effect: the present disclosure provides the brightness correcting method of the display panel and the brightness correcting device, which divide the displayed image of the display panel into the first area and the plurality of second areas disposed surrounding the first area. The brightness correction factor of each of the second areas is obtained according to the brightness of the first area and the brightness of each of the second areas. An optical compensation value is adjusted according to the brightness correction factor. Therefore, the brightness of the display panel can be corrected, thereby allowing uniformity of overall brightness of the display panel to meet requirements.

BRIEF DESCRIPTION OF THE DRAWINGS

The accompanying figures to be used in the description of embodiments of the present disclosure will be described in brief to more clearly illustrate the technical solutions of the embodiments. The accompanying figures described below are only part of the embodiments of the present disclosure, from which those skilled in the art can derive further figures without making any inventive efforts.

DETAILED DESCRIPTION

Figure 1:
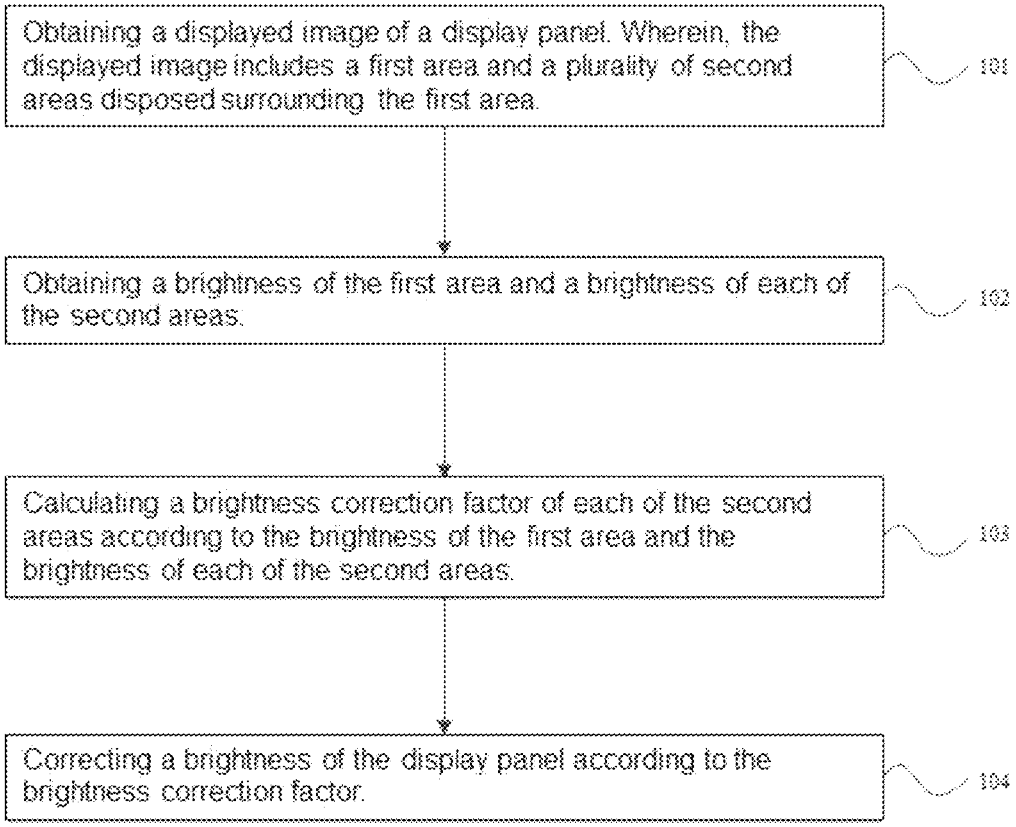
FIG. 1 is a first flowchart of a brightness correcting method of a display panel according to an embodiment of the present disclosure.

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative efforts are within the scope of the present disclosure.

In the description of the present disclosure, it should be understood that terms such as "length", "width", "thickness", "on", "under", as well as derivative thereof should be construed to refer to the orientation as described or as shown in the drawings under discussion. These relative terms are for convenience of description, do not require that the present disclosure be constructed or operated in a particular orientation, and shall not be construed as causing limitations to the present disclosure. In the description of the present disclosure, "a plurality of" relates to two or more than two, unless otherwise specified.

In the description of the present disclosure, it should be understood that terms such as "first" and "second" are used herein for purposes of description and are not intended to indicate or imply relative importance or implicitly indicating the number of technical features indicated. Thus, features limited by "first" and "second" are intended to indicate or imply including one or more than one of these features, and shall not be construed as causing limitations to the present disclosure.

An embodiment of the present disclosure provides a brightness correcting method of a display panel and a brightness correcting device. They will be described in detail in the following. It should be noted that an order of description in the following embodiments is not meant to limit a preferred order of the embodiments.

Referring to FIG. 1, FIG. 1 is a first flowchart of the brightness correcting method of the display panel according to an embodiment of the present disclosure. As shown in FIG. 1, the brightness correcting method of the display panel includes following steps:

step 101: obtaining a displayed image of the display panel. Wherein, the displayed image includes a first area and a plurality of second areas disposed surrounding the first area.

Wherein, the first area and the second areas are arranged in a 3*3 matrix. A width of the first area and a width of each of the second areas are both one third of a width of the displayed image, and a length of the first area and a length of each of the second areas are both one third of a length of the displayed image.

Wherein, it should be noted that areas causing brightness uniformity of current display panels to not be up to standards are generally two corners on one side of source electrodes. Therefore, dividing the displayed image into the first area and the second areas arranged in the 3*3 matrix and having them have a same area can allow a measurement area of the display panel to be better matched with measurement specifications of the display panel. Therefore, brightness corrections of the display panel can be more accurate based on reduced processes, and overall brightness uniformity of the display panel can be better.

Wherein, the step of obtaining the displayed image of the display panel specifically includes following steps:

(1) removing image sticking of the display panel to allow the display panel to be in an initial state.

Wherein, the display panel has an image sticking phenomenon. Therefore, if the displayed image of the display panel is directly obtained, a brightness of an obtained displayed image will be in error with an actual brightness, thereby affecting accuracy of the brightness corrections of the display panel. Therefore, before obtaining the displayed image of the display panel, a removing operation is needed to remove the image sticking of the display panel, thereby allowing the display panel to be in the initial state and preventing the image sticking of the display panel from affecting the accuracy of the brightness corrections of the display panel in subsequent processes.

(2) Sending a white image to the display panel.

Wherein, the embodiments of the present disclosure correct a brightness of the display panel, but do not correct colors. Therefore, only grayscale images need to be detected. Therefore, it is only necessary to send the white image having a fixed grayscale to the display panel and to measure a brightness of the white image. Wherein, the fixed grayscale may be one of 0 grayscale, 24 grayscale, 32 grayscale, 64 grayscale, 96 grayscale, 128 grayscale, 225 grayscale, or 255 grayscale.

(3) Obtaining the displayed image of the display panel when displaying the white image.

Step 102: obtaining a brightness of the first area and a brightness of each of the second areas.

The step of obtaining the brightness of the first area and the brightness of each of the second areas specifically includes following steps:

(1) obtaining a central point of the first area and a central point of each of the second areas.

It should be noted that the central point of the first area is a geometric center of the first area, that is, an intersection of two diagonals of the first area, and the central point of each of the second areas is a geometric center of each of the second areas, that is, an intersection of two diagonals of each of the second areas.

(2) Obtaining a brightness of the central point of the first area and defining the brightness of the central point of the first area as the brightness of the first area.

It should be noted that the brightness has differences in different positions in the first area, and the brightness of the central point of the first area is a middle value among the brightness in different positions in the first area. Therefore, selecting the brightness of the central point of the first area to be the brightness of the first area can make the brightness uniformity of the display panel after the brightness corrections better.

It should be noted that the brightness of the central point of the first area is obtained by a color analyzer. Specifically, the brightness of the central point of the first area may be obtained using the color analyzer of CA310 or CA410. The brightness of the central point of the first area is measured by using a probe of the color analyzer of CA310 or CA410 to point to the central point of the first area in perpendicular to the first area.

It should be noted that selection of the color analyzer is based on resolution, size, shooting distance, and accuracy of optical compensation of the display panel.

(3) Obtaining a brightness of the central point of each of the second areas and defining the brightness of the central point of each of the second areas as the brightness of each of the second areas.

It should be noted that the brightness has differences in different positions in the second areas, and the brightness of the central point of each of the second areas is a middle value among the brightness in different positions in the second areas. Therefore, selecting the brightness of the central point of each of the second areas to be the brightness of each of the second areas can make the brightness uniformity of the display panel after the brightness corrections better.

It should be noted that the brightness of the central point of each of the second areas is obtained by the color analyzer. Specifically, the brightness of the central point of each of the second areas may be obtained using the color analyzer of CA310 or CA410. The brightness of the central point of each of the second areas is measured by using the probe of the color analyzer of CA310 or CA410 to point to the central point of each of the second areas in perpendicular to each of the second areas.

Step 103: calculating a brightness correction factor of each of the second areas according to the brightness of the first area and the brightness of each of the second areas.

The step of calculating the brightness correction factor of each of the second areas according to the brightness of the first area and the brightness of each of the second areas specifically includes following steps:

(1) calculating a ratio of the brightness of the first area to the brightness of each of the second areas, wherein, the ratio is a quotient of the brightness of the first area divided by the brightness of each of the second areas.

(2) Defining the ratio as the brightness correction factor of each of the second areas.

Wherein, it should be noted that the brightness correction factor of each of the second areas may be calculated by a following formula:

$$K\_m = l\_5/l\_m,\ m = 1, 2, 3, \ldots, \text{ or } 9;$$

wherein, K_m means the brightness correction factor of each of the second areas, l_m means the brightness of each of the second areas, l_5 means the brightness of the first area, and m means an identifier of different second areas.

From the above formula, it can be known that the brightness of each of the second areas is consistent with the brightness of the first area after correcting by the brightness correction factor. Therefore, the brightness uniformity of the display panel can be improved.

It should be noted that the first area also has a brightness correction factor. However, since the process of the brightness corrections takes the brightness of the first area in a center of the display panel as a brightness correction value, it is not necessary to correct the brightness of the first area, and the brightness correction factor of the first area is 1 by default.

It should be noted that the brightness correction factor needs to be saved in a server after the brightness correction factor is calculated. In addition, the brightness correction factor includes a film position identification code, and the film position identification code is configured to identify the brightness correction factor for calling a corresponding brightness correction factor when correcting the brightness of the display panel. For example, the brightness correction factor of each of the second areas may be saved as M01K1, M01K2, . . . , M01K9, M02K1, M02K2, . . . , or M02K9. Wherein, K1, K2, . . . , and K9 are identifiers of different areas, and M01, M02, etc. are identifiers of different film positions of the display panel.

Step 104: correcting the brightness of the display panel according to the brightness correction factor.

The step of correcting the brightness of the display panel according to the brightness correction factor specifically includes following steps:

(1) adjusting a compensation value of the display panel according to the brightness correction factor.

It should be noted that in optical compensation, the brightness of the display panel cannot be directly adjusted, and it can only be adjusted indirectly by adjusting the compensation value of the display panel. Therefore, the compensation value of the display panel needs to be adjusted according to the brightness correction factor, thereby improving an uneven brightness phenomenon of the display panel and improving the brightness uniformity of the display panel.

(2) Compensating the display panel using an adjusted compensation value to correct the brightness of the display panel.

Figure 2:
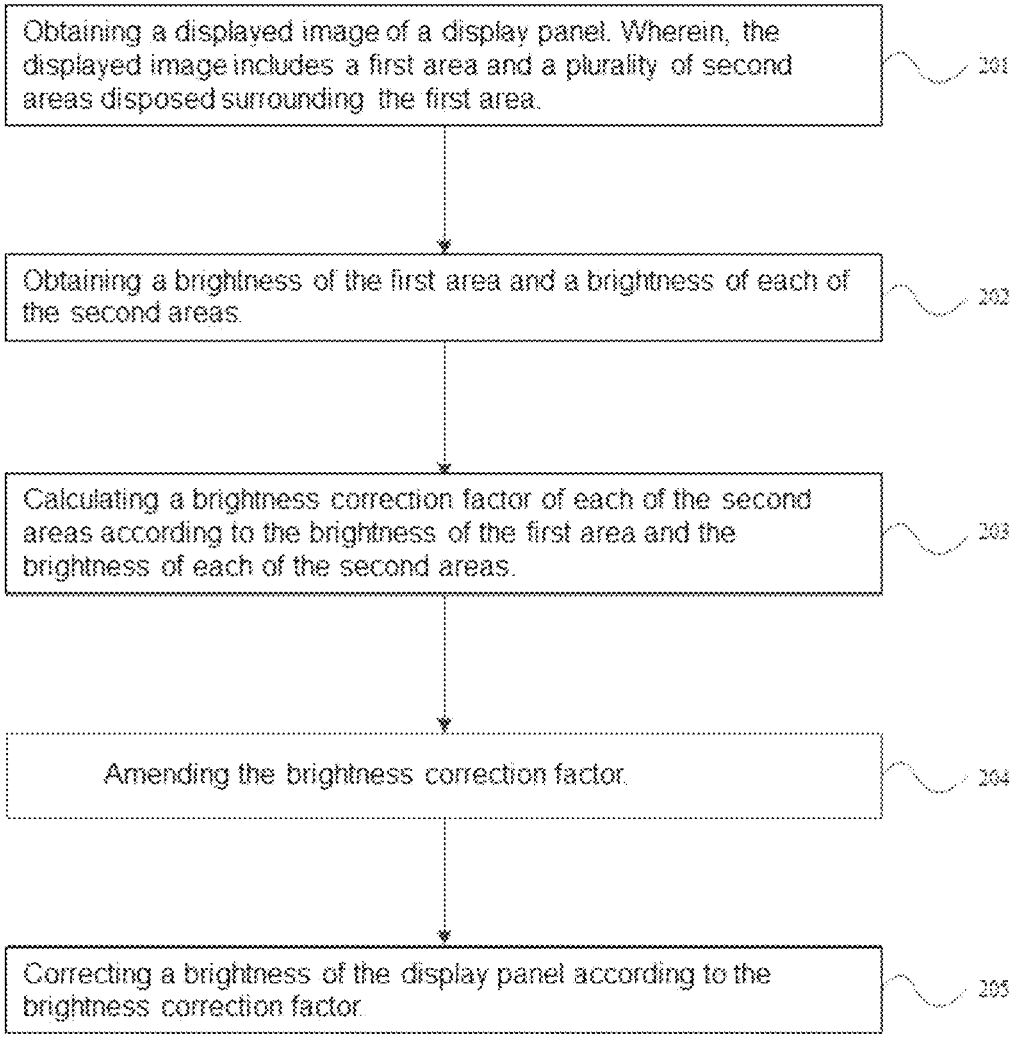
FIG. 2 is a second flowchart of the brightness correcting method of the display panel according to an embodiment of the present disclosure.
Figure 3:
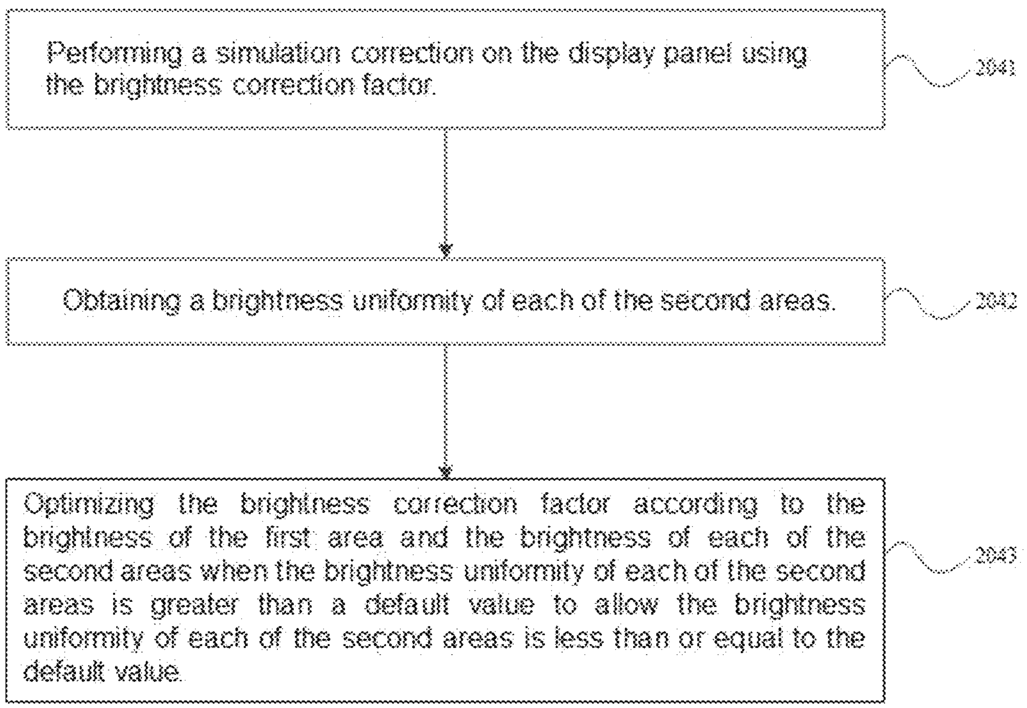
FIG. 3 is a sub flowchart of the brightness correcting method of the display panel according to an embodiment of the present disclosure.

Referring to FIGS. 2 and 3, FIG. 2 is a second flowchart of the brightness correcting method of the display panel according to an embodiment of the present disclosure. As shown in FIG. 2, the brightness correcting method of the display panel includes following steps:

step 201: obtaining the displayed image of the display panel. Wherein, the displayed image includes the first area and the plurality of second areas disposed surrounding the first area.

Step 202: obtaining the brightness of the first area and the brightness of each of the second areas.

Step 203: calculating the brightness correction factor of each of the second areas according to the brightness of the first area and the brightness of each of the second areas.

Step 204: amending the brightness correction factor.

It should be noted that since the present disclosure corrects the brightness of the display panel by adjusting the compensation value to indirectly compensate the display panel, there will be a certain error, resulting in the brightness corrections of the display panel unable to reach an expected effect. Therefore, it is necessary to amend the brightness correction factor to make the brightness uniformity of the display panel meet requirements.

FIG. 3 is a sub flowchart of the brightness correcting method of the display panel according to an embodiment of the present disclosure. As shown in FIG. 3, the step of correcting the brightness of the display panel according to the brightness correction factor includes following steps:

step 2041: performing a simulation correction on the display panel using the brightness correction factor.

step 2042: obtaining a brightness non-uniformity of each of the second areas.

Wherein, it should be noted that the brightness non-uniformity of each of the second areas may be calculated by a following formula:

$$Y\_m = \left|(l\_m - l\_5)/l\_5\right| \times 100\%,\ m = 1, 2, 3, \ldots, \text{ or } 9;$$

wherein, Y_m means the brightness non-uniformity of each of the second areas, l_m means the brightness of each of the second areas, l_5 means the brightness of the first area, and m means the identifier of different second areas.

It should be noted that when a brightness difference in different areas of the display panel is small, the brightness uniformity of the display panel is better. Therefore, the brightness difference in different areas of the display panel can be reduced by adjusting the brightness of the display panel, thereby allowing the brightness uniformity of the display panel to meet the requirements.

Step 2043: optimizing the brightness correction factor according to the brightness of the first area and the brightness of each of the second areas when the brightness non-uniformity of each of the second areas is greater than a default value to allow the brightness non-uniformity of each of the second areas to be less than or equal to the default value.

Wherein, when a brightness non-uniformity of a certain second area is greater than the default value, it is necessary to adjust the brightness correction factor of each of the second areas rather than only adjusting the brightness correction factor of an area having the brightness non-uniformity that does not meet the requirements.

It should be noted that the brightness correction factor of each of the second areas may be adjusted according to a following formula:

$$K\_m\hat{}' = K\_m\,(l\_m\hat{}')/(l\_5\hat{}'),\ m = 1, 2, 3, \ldots, \text{ or } 9;$$

wherein, K_m^' means the brightness correction factor of each of the second areas after adjusting, K_m means the brightness correction factor of each of the second areas before adjusting, l_m^' means the brightness of each of the second areas after the simulation correction, l_5^' means the brightness of the first area after the simulation correction, and m means the identifier of different second areas.

Wherein, when the brightness non-uniformity of the certain second area is greater than the default value, it is necessary to repeat the above steps to adjust the brightness correction factor of each of the second areas. Specifically, the brightness correction factor is adjusted by iterative calculation to reduce errors until the brightness non-uniformity of each of the second areas is less than or equal to the default value, thereby allowing the brightness uniformity of the display panel to meet the requirements.

Wherein, it should be noted that the default value ranges from 8% to 12%. Specifically, the default value may be one of 8%, 9%, 10%, 11%, or 12%, and a specific value of the default value may be determined by specifications and requirements of the display panel.

Step 205: correcting the brightness of the display panel according to the brightness correction factor.

The brightness correcting method of the display panel provided in the embodiments of the present disclosure divides the displayed image of the display panel into the first area and the plurality of second areas disposed surrounding the first area. The brightness correction factor of each of the second areas is obtained according to the brightness of the first area and the brightness of each of the second areas. An optical compensation value is adjusted according to the brightness correction factor. Therefore, the brightness of the display panel can be corrected, thereby allowing uniformity of overall brightness of the display panel to meet the requirements.

In order to better implement the above methods, an embodiment of the present disclosure further provides the brightness correcting device of the display panel.

Figure 4:
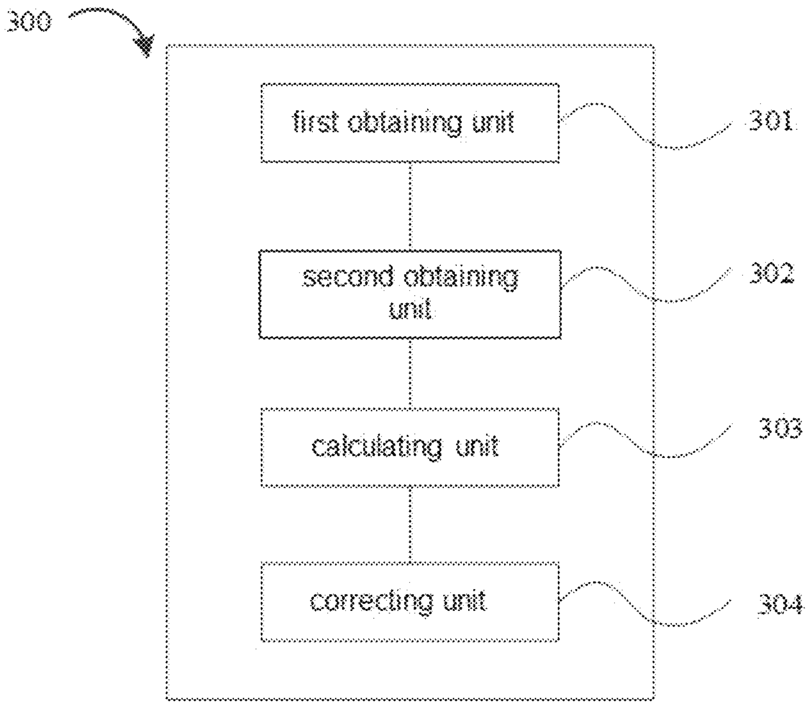
FIG. 4 is a first schematic structural diagram of a brightness correcting device of the display panel according to an embodiment of the present disclosure.

Referring to FIG. 4, FIG. 4 is a first schematic structural diagram of the brightness correcting device of the display panel according to an embodiment of the present disclosure. The brightness correcting device 300 includes a first obtaining unit 301, a second obtaining unit 302, a calculating unit 303, and a correcting unit 304, and the details are as follows.

(1) The first obtaining unit 301 is configured to obtain the displayed image of the display panel. Wherein, the displayed image includes the first area and the plurality of second areas disposed surrounding the first area.

(2) The second obtaining unit 302 is configured to obtain the brightness of the first area and the brightness of each of the second areas.

(3) The calculating unit 303 is configured to calculate the brightness correction factor of each of the second areas according to the brightness of the first area and the brightness of each of the second areas.

(4) The correcting unit is configured to correct the brightness of the display panel according to the brightness correction factor.

Figure 5:
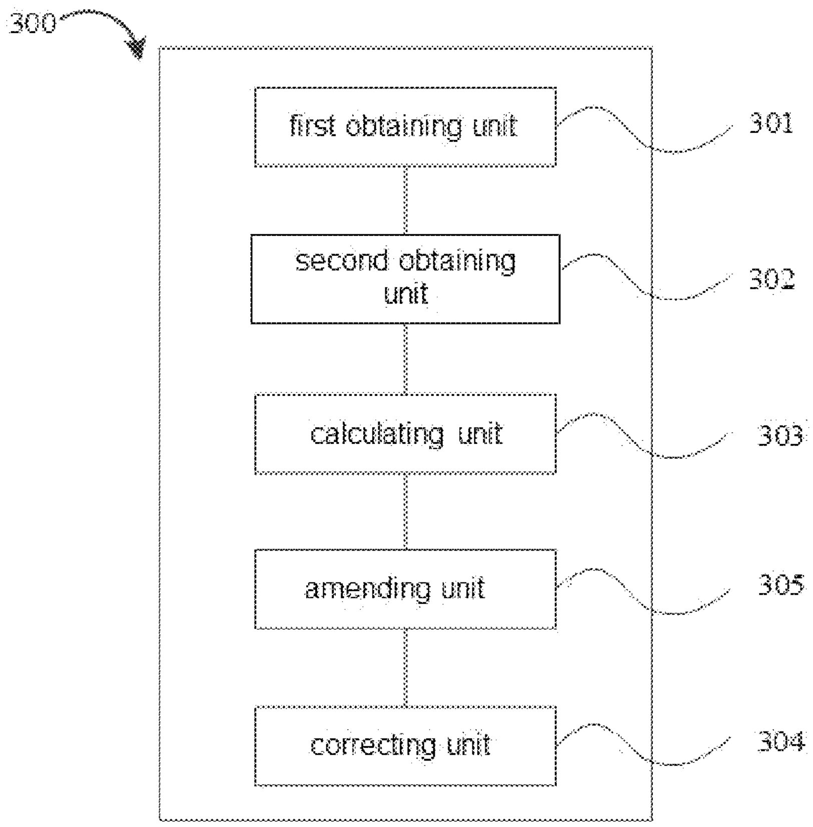
FIG. 5 is a second schematic structural diagram of the brightness correcting device of the display panel according to an embodiment of the present disclosure.

Referring to FIG. 5, FIG. 5 is a second schematic structural diagram of the brightness correcting device of the display panel according to an embodiment of the present disclosure. A difference between the brightness correcting device 300 shown in FIG. 5 and the brightness correcting device 300 shown in FIG. 4 is that the brightness correcting device 300 shown in FIG. 5 further includes an amending unit 305.

The amending unit 305 is configured to amend the brightness correction factor.

The brightness correcting device of the display panel provided in the embodiment of the present disclosure divides the displayed image of the display panel into the first area and the plurality of second areas disposed surrounding the first area. The brightness correction factor of each of the second areas is obtained according to the brightness of the first area and the brightness of each of the second areas. The optical compensation value is adjusted according to the brightness correction factor. Therefore, the brightness of the display panel can be corrected, thereby allowing the uniformity of overall brightness of the display panel to meet requirements.

The brightness correcting method of the display panel and the brightness correcting device provided in the embodiments of the present disclosure are described in detail above. Specific examples are used herein to explain the principles and implementation of the present disclosure. The descriptions of the above embodiments are only used to help understand the methods and main ideas thereof of the present disclosure. Meanwhile, for those skilled in the art, the range of specific implementation and application may be changed according to the ideas of the present disclosure. In summary, the content of the specification should not be construed as causing limitations to the present disclosure.

What is claimed is:

1. A brightness correcting method of a display panel, comprising following steps:

obtaining a displayed image of the display panel, wherein the displayed image comprises a first area and a plurality of second areas disposed surrounding the first area;

obtaining a brightness of the first area and a brightness of each of the second areas;

calculating a brightness correction factor of each of the second areas according to the brightness of the first area and the brightness of each of the second areas; and correcting a brightness of the display panel according to the brightness correction factor, wherein the brightness correction factor comprises a film position identification code, the film position identification code comprises identifiers of different areas and identifiers of different film positions of the display panel, and the film position identification code is configured to identify the brightness correction factor for calling a corresponding brightness correction factor when correcting the brightness of the display panel.

2. The brightness correcting method of the display panel according to claim 1, wherein a width of the first area and a width of each of the second areas are both one third of a width of the displayed image, and a length of the first area and a length of each of the second areas are both one third of a length of the displayed image.

3. The brightness correcting method of the display panel according to claim 1, wherein the step of obtaining the brightness of the first area and the brightness of each of the second areas comprises following steps:

obtaining a central point of the first area and a central point of each of the second areas;

obtaining a brightness of the central point of the first area and defining the brightness of the central point of the first area as the brightness of the first area; and obtaining a brightness of the central point of each of the second areas and defining the brightness of the central point of each of the second areas as the brightness of each of the second areas.

4. The brightness correcting method of the display panel according to claim 1, wherein the step of calculating the brightness correction factor of each of the second areas according to the brightness of the first area and the brightness of each of the second areas comprises following steps:

calculating a ratio of the brightness of the first area to the brightness of each of the second areas, wherein the ratio is a quotient of the brightness of the first area divided by the brightness of each of the second areas; and defining the ratio as the brightness correction factor of each of the second areas.

5. The brightness correcting method of the display panel according to claim 1, wherein before the step of correcting the brightness of the display panel according to the brightness correction factor, the method further comprises:

amending the brightness correction factor.

6. The brightness correcting method of the display panel according to claim 5, wherein the step of amending the brightness correction factor comprises following steps:

performing a simulation correction on the display panel using the brightness correction factor;

obtaining a brightness non-uniformity of each of the second areas; and optimizing the brightness correction factor according to the brightness of the first area and the brightness of each of the second areas when the brightness non-uniformity of each of the second areas is greater than a default value to allow the brightness non-uniformity of each of the second areas to be less than or equal to the default value.

7. The brightness correcting method of the display panel according to claim 6, wherein when a brightness non-uniformity of a certain second area is greater than the default value, adjust the brightness correction factor of each of the second areas according to a following formula:

K_m^′ = K_m(l_m^′)/(l_5^′), *m* = 1, 2, 3, … , or 9;

wherein, K_m^' means the brightness correction factor of each of the second areas after adjusting, K_m means the brightness correction factor of each of the second areas before adjusting, l_m^' means the brightness of each of the second areas after the simulation correction, l_5^' means the brightness of the first area after the simulation correction, and m means the identifier of different second areas.

8. The brightness correcting method of the display panel according to claim 6, wherein the brightness non-uniformity of each of the second areas is calculated by a following formula:

Y_m = |(l_m − l_5)/l_5| × 100%, *m* = 1, 2, 3, … , or 9;

wherein, Y_m means the brightness non-uniformity of each of the second areas, l_m means the brightness of each of the second areas, l_5 means the brightness of the first area, and m means the identifier of different second areas.

9. The brightness correcting method of the display panel according to claim 1, wherein the step of correcting the brightness of the display panel according to the brightness correction factor comprises following steps:

adjusting a compensation value of the display panel according to the brightness correction factor; and compensating the display panel using an adjusted compensation value to correct the brightness of the display panel.

10. The brightness correcting method of the display panel according to claim 1, wherein the step of obtaining the displayed image of the display panel comprises following steps:

removing image sticking of the display panel to allow the display panel to be in an initial state;

sending a white image to the display panel; and obtaining the displayed image of the display panel when displaying the white image.

11. The brightness correcting method of the display panel according to claim 10, wherein the sending the white image to the display panel comprises:

sending the white image having a fixed grayscale to the display panel and measuring a brightness of the white image.

12. A brightness correcting method of a display panel, comprising following steps:

obtaining a displayed image of the display panel, wherein the displayed image comprises a first area and a plurality of second areas disposed surrounding the first area, a width of the first area and a width of each of the second areas are both one third of a width of the displayed image, and a length of the first area and a length of each of the second areas are both one third of a length of the displayed image;

obtaining a brightness of the first area and a brightness of each of the second areas;

calculating a brightness correction factor of each of the second areas according to the brightness of the first area and the brightness of each of the second areas;

amending the brightness correction factor; and correcting a brightness of the display panel according to an amended brightness correction factor;

wherein the brightness correction factor comprises a film position identification code, the film position identification code comprises identifiers of different areas and identifiers of different film positions of the display panel, and the film position identification code is configured to identify the brightness correction factor for calling a corresponding brightness correction factor when correcting the brightness of the display panel.

13. The brightness correcting method of the display panel according to claim 12, wherein the step of obtaining the brightness of the first area and the brightness of each of the second areas comprises following steps:

obtaining a central point of the first area and a central point of each of the second areas;

obtaining a brightness of the central point of the first area and defining the brightness of the central point of the first area as the brightness of the first area; and obtaining a brightness of the central point of each of the second areas and defining the brightness of the central point of each of the second areas as the brightness of each of the second areas.

14. The brightness correcting method of the display panel according to claim 13, wherein the central point of the first area is a geometric center of the first area, and the central point of each of the second areas is a geometric center of each of the second areas.

15. The brightness correcting method of the display panel according to claim 12, wherein the step of calculating the brightness correction factor of each of the second areas according to the brightness of the first area and the brightness of each of the second areas comprises following steps:

calculating a ratio of the brightness of the first area to the brightness of each of the second areas, wherein the ratio is a quotient of the brightness of the first area divided by the brightness of each of the second areas; and defining the ratio as the brightness correction factor of each of the second areas.

16. The brightness correcting method of the display panel according to claim 12, wherein the step of amending the brightness correction factor comprises following steps:

performing a simulation correction on the display panel using the brightness correction factor;

obtaining a brightness non-uniformity of each of the second areas; and optimizing the brightness correction factor according to the brightness of the first area and the brightness of each of the second areas when the brightness non-uniformity of each of the second areas is greater than a default value to allow the brightness non-uniformity of each of the second areas to be less than or equal to the default value.

17. The brightness correcting method of the display panel according to claim 16, wherein the default value ranges from 8% to 12%.

18. The brightness correcting method of the display panel according to claim 12, wherein the step of correcting the brightness of the display panel according to the brightness correction factor comprises following steps:

adjusting a compensation value of the display panel according to the brightness correction factor; and compensating the display panel using an adjusted compensation value to correct the brightness of the display panel.

19. The brightness correcting method of the display panel according to claim 12, wherein the step of obtaining the displayed image of the display panel comprises following steps:

removing image sticking of the display panel to allow the display panel to be in an initial state;

sending a white image to the display panel; and obtaining the displayed image of the display panel when displaying the white image.

20. The brightness correcting method of the display panel according to claim 19, wherein the sending the white image to the display panel comprises:

sending the white image having a fixed grayscale to the display panel and measuring a brightness of the white image.

* * * * *